United States Patent [19]

Brown et al.

[11] Patent Number: 4,758,539

[45] Date of Patent: Jul. 19, 1988

[54] PROCESS FOR PRODUCING CERAMIC NITRIDES AND CARBONITRIDES AND THEIR PRECURSORS

[75] Inventors: Gilbert M. Brown, Knoxville; Leon Maya, Oak Ridge, both of Tenn.

[73] Assignee: The United States of America as represented by the United States Department of Energy, Washington, D.C.

[21] Appl. No.: 18,390

[22] Filed: Feb. 25, 1987

[51] Int. Cl.$^4$ .............................................. C04B 35/58
[52] U.S. Cl. ........................................ 501/96; 501/94; 260/349; 556/42; 556/51; 556/57
[58] Field of Search ................... 501/94, 96; 260/349; 556/51, 57, 42

[56] References Cited

U.S. PATENT DOCUMENTS

| | | | |
|---|---|---|---|
| 3,394,156 | 7/1968 | Kornicker et al. | 556/42 |
| 4,051,185 | 9/1977 | Prescott et al. | 564/497 |
| 4,609,722 | 9/1986 | Coffey et al. | 528/310 |

Primary Examiner—William R. Dixon, Jr.
Assistant Examiner—Anthony Green
Attorney, Agent, or Firm—Katherine P. Lovingood; Stephen D. Hamel; Judson R. Hightower

[57] ABSTRACT

A process for preparing ceramic nitrides and carbonitrides in the form of very pure, fine particulate powder. Appropriate precursor is prepared by reacting a transition metal alkylamide with ammonia to produce a mixture of metal amide and metal imide in the form of an easily pyrolyzable precipitate.

15 Claims, No Drawings

PROCESS FOR PRODUCING CERAMIC NITRIDES AND CARBONITRIDES AND THEIR PRECURSORS

This invention was developed pursuant to a contract with the United States Department of Energy.

This invention relates to processes for preparing ceramic nitrides and carbonitrides, and more particularly to processes to prepare high metal content organometallic precursors that may be pyrolyzed to form ceramic nitrides and carbonitrides.

BACKGROUND OF THE INVENTION

Advanced ceramic materials are chemically inert compounds with high thermal stability and mechanical strength. Such characteristics make these materials attractive candidates for applications such as heat engines, cutting tools, and turbine blades, articles which are presently made with expensive super alloys. Current interest in advanced ceramics centers around such materials as carbides, nitrides, borides, and silicides which have properties of hardness, corrosion resistance, and thermal stability that cannot be matched by metallic alloys or other structural materials. Examples of these ceramic materials are SiC, $Si_3N_4$, TiC, TiN, VC, WC, and BN. Other nitrides and carbonitrides are useful as superconducting materials and include NbN, MoN, and Nb(C,N).

Although chemical inertness of advanced ceramics is in advantage in these applications, it makes fabrication of components through pressing and sintering a difficult task and places stringent demands on the purity and morphology of the starting materials. Previously, these compounds were prepared by a very high temperature reaction in a nitrogen atmosphere using metal oxide or pure metal powder and carbon as reactants. The reaction yielded clumps of product material that had to be ground into a powder before it could be used. Not only are the high temperature reaction and grinding steps difficult and costly processes, they can also be a serious source of contamination.

More recently, attempts have been made to prepare metal nitrides by reacting the transition metal halides with ammonia or a nitrogen and hydrogen gas mixture. The ammonia or nitrogen atmosphere not only provides the reactant for making the nitride, but it also assures the absence of oxygen which can cause damage of the final ceramic product if it is present during the reaction. However, when titanium chloride was reacted with ammonia at 1000° C., the titanium nitride product was in the form of hard clumps that required grinding before it could be used, and there was also a hydrogen chloride by-produce which is reactive and corrosive to the ceramic material.

To further improve this process, a borohydride has been added to the reaction to prevent a reverse reaction of the ammonium halide and allow the reaction to proceed under moderate conditions producing a transition metal haloamide precursor. This precursor, when reacted with a salt to displace the halide, forms a transition metal amide that forms a nitride upon pyrolysis.

Transition metal alkylamides can be pyrolyzed into ceramics, but the process is very inefficient. The starting material has a low metal content and is a liquid that tends to volatilize during pyrolysis. A high metal content precursor is desirable in order to prepare a ceramic powder with maximum efficiency.

Such problems have led researchers to attempt to develop appropriate precursors that can be converted to ceramic materials by chemical means requiring less rigorous conditions and producing a product that is in a more readily usable form. This accomplishment would be an important development in the area of ceramic production.

SUMMARY OF THE INVENTION

In view of the above needs, it is an object of this invention to provide a process for preparing ceramics using readily available materials and moderate reaction conditions.

It is also an object of this invention to provide a process for preparing ceramics that results in a product that is in a readily usable form and does not produce reactive by-products.

It is a further object of this invention to provide precursors of high metal content the process for making ceramics.

Another object of this invention is to provide a process for preparing ceramics that is fast and provides good yields.

It is also an object of this invention to provide ceramics that are pure and in fine particulate form. Upon further study of the specifications and appended claims, further objects and advantages of this invention will become apparent to those skilled in the art.

To achieve the foregoing and other objects in accordance with the purpose of the present invention, the process of this invention may comprise a process for preparing a high metal content precursor to metal nitride or carbonitride ceramics wherein a transition metal alkylamide is reacted with ammonia to form a precursor in the form of a precipitate. The invention relates to a precursor that is a mixture of imide and amide of a transition metal prepared by the above-disclosed process. The invention is also a process for preparing ceramics and comprises pyrolyzing the precursor to produce the nitride or carbonitride.

Among the many advantages of preparing ceramics in this way includes a reaction that proceeds at moderate conditions, formation of fine particulate precursors of high metal content resulting in maximum product upon pyrolysis, and a very pure ceramic with minimum amorphous carbon content.

DETAILED DESCRIPTION OF THE PREFERRED EMBODIMENT

The preparation of advanced ceramic materials requires, in general, the exclusion of oxygen since the presence of this element can have detrimental effects on the properties of some ceramics. Thus, the use of oxygen-free reactants and solvents is almost a necessity in the preparation of precursors. For this reason, liquid ammonia is a useful reaction medium for conducting this type of synthetic chemistry. Titanium alkylamides were chosen as convenient starting materials since they are readily available and exhibit a high degree of purity.

At room temperature, titanium alkylamide undergoes ammonolytic reactions in liquid ammonia or in an ammonia gas sparged solvent to yield essentially titanium amide/imide, a high metal content material. Alkylamides generally contain 20–30% metal while the amide/imides produced in accordance with this invention contain 50–70% metal. This is due to the fact that the amide and imide ligands are much lighter than the alkylamide ligands.

In a first aspect of this invention, the metal alkylamide compound was loaded in an oxygen-free atmosphere into a heavy-walled glass reaction vessel to which was added liquid ammonia. The reaction vessel was sealed and the mixture was maintained at room temperature. In all cases, the transamination reactions appeared to occur nearly instantaneously as evidenced by color changes and the formation of a precipitate that is a mixture of imides and amides that are not conducive to easy separation and identification. After allowing the precipitate to settle, the supernatant was removed. The solid was washed with liquid ammonia several times to remove any ammonia soluble species. The ammonia was removed by distillation, and the solid precursor was evacuated for several hours to remove remaining ammonia. Caution should be exercised since these materials are pyrophoric on exposure to the atmosphere. An idealized reaction equation for the production of a high nitrogen content species of precursor is

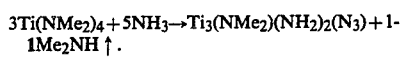

In a second aspect of this invention, the ammonolysis of titanium alkylamide was carried out the same as previously described except that it was performed in triethylamine solution instead of liquid ammonia. A metal alkylamide was added by syringe to triethylamine in a vessel with provisions for gas inlets. Ammonia gas was introduced through a frit below the surface of the stirred solution. Reaction took place as soon as $NH_3$ reached the solution, producing a colored precipitate indicative of the amide/imide. To produce a precursor containing more carbon-containing ligands, the bubbling of ammonia can be stopped at this point. Ammonia was bubbled through the solution for about an hour to produce a high nitrogen content precursor. The solution was sparged with argon for two hours to remove the dissolved ammonia, and the solvent was removed. The vessel was evacuated for several hours at room temperature to remove any volatile material. The IR spectrum of this precursor was essentially identical with the ammonolysis product of titanium alkylamide in liquid ammonia as described in the first aspect of this invention. Any organic solvent that is nonreactive to the alkylamide or ammonia, such as an ether, hydrocarbon, or tertiary amine, would be suitable for use in this process.

The high metal content precursors resulting from these processes can be pyrolyzed at 600°–800° C. to produce correspondingly high yields of the ceramic material TiN or Ti[C,N] in the form of homogeneous, free-flowing, finely divided powders.

An additional important finding is that the carbon content which is left as a residue of the pyrolysis can be significantly decreased if the thermal treatment is performed under a stream of hydrogen instead of dynamic vacuum or helium flow. An idealized reaction equation for the pyrolysis under hydrogen to produce the ceramic nitride is

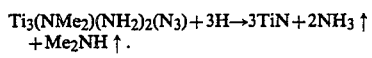

Additional alkyl groups attached to the metal in the precursor can cause the production of the carbonitride Ti[C,N].

This invention has also been found to be suitable for the production of nitrides and carbonitrides of niobium and zirconium. It should be obvious to a person of ordinary skill in the art to apply the invention disclosed herein to prepare precursors and ceramics from other transition metals such as vanadium, molybdenum, hafnium, tantalum, and tungsten.

EXAMPLE I

According to the process described in the first aspect of this invention, $Ti(NMe_2)_4$ containing 21.4% Ti was reacted with liquid ammonia at room temperature to form a brick red amide/imide complex that contained 55.4% Ti. This complex precursor was pyrolyzed at 600° C. in a dynamic hydrogen atmosphere to produce Ti[C,N] that contained approximately 80% Ti. Only 3.0% amorphous carbon was present, as compared with 5.8% found in samples heated in various inert atmospheres.

EXAMPLE II

Using the same process, $Zr[N(Et)_2]_4$ containing 24.1% Zr was reacted with liquid ammonia at room temperature to form a pale yellow amide/imide precursor that contained 65.7% Zr. This was pyrolyzed at 600° C. in a dynamic hydrogen atmosphere to produce Zr[C,N] that contained 2.0% amorphous carbon, compared with 2.7% when pyrolyzed in an inert atmosphere.

EXAMPLE III

In a third example using the same process, $Nb[N(Et)_2]_5$ containing 20.4% Nb was converted into a nearly black colored amide/imide complex containing 56.6% Nb in liquid ammonia at room temperature. The amide/imide was heated to 600° C. in a dynamic hydrogen atmosphere to produce Nb[C,N]. Amorphous carbon was only 1.6% compared with 7.5% when pyrolyzed in an inert atmosphere.

EXAMPLE IV

According to the process described in the second aspect of this invention, the ammonolysis of $Ti[N(CH_3)_2]_4$ was carried out in triethylamine solution. A 13.8 g portion of $Ti[N(CH_3)_2]_4$ was added by syringe to 80 ml of $N(C_2H_5)_3$ in a flask with provisions for gas inlets. Ammonia was introduced through a frit below the surface of the stirred solution. Reaction took place as soon as $NH_3$ reached the solution, producing a brick red precipitate. Ammonia was bubbled through the solution for 1 hr with no additional changes in appearance. The solution was sparged with argon for 2 hr to remove the dissolved ammonia, and the solvent was removed by vacuum. The flask was evacuated overnight at room temperature to remove any volatile material. The IR spectrum of this material is essentially identical with the ammonolysis product of $Ti[N(CH_3)_2]_4$ in liquid ammonia.

The alkylamide starting materials used in these examples are available from Alfa Inorganics, Danvers, Mass., and from Sharpe Chemical Company, Burbank, Calif.

What is claimed is:

1. A process for preparing a ceramic precursor comprising the steps:
(A) reacting a transition metal alkylamide with ammonia to produce a precipitate;
(B) isolating said precipitate.

2. A ceramic precursor prepared by the process of claim 1.

3. The process of claim 1 wherein said transition metal alkylamide is an alkylamide of a transition metal selected from the group consisting of titanium, vanadium, zirconium, niobium, molybdenum, hafnium, tantalum, and tungsten.

4. A ceramic precursor prepared by the process of claim 3.

5. The process of claim 3 wherein said transition metal is selected from the group consisting of titanium, zirconium and niobium.

6. A ceramic precursor prepared by the process of claim 5.

7. A process for preparing ceramics comprising
reacting a transition metal alkylamide with ammonia to produce a precipitate;
isolating said precipitate;
pyrolyzing said precipitate in a nonoxidizing environment.

8. The process of claim 7 wherein said atmosphere is hydrogen.

9. The process of claim 7 wherein said transition metal alkylamide is an alkylamide of a transition metal selected from the group consisting of titanium, vanadium, zirconium, niobium, molybdenum, hafnium, tantalum and tungsten.

10. The process of claim 9 wherein said atmosphere is hydrogen.

11. The process of claim 9 wherein said transition metal alkylamide is selected from the group consisting of titanium, zirconium and niobium.

12. The process of claim 11 wherein said atmosphere is hydrogen.

13. The process of claim 7 wherein said precipitate is pyrolyzed at a temperature of about 600° C. or greater.

14. The process of claim 9 wherein said precipitate is pyrolyzed at a temperature of about 600° C. or greater.

15. The process of claim 11 wherein said precipitate is pyrolyzed at a temperature of about 600° C. or greater.

* * * * *